(12) United States Patent
Tung et al.

(10) Patent No.: US 10,614,086 B2
(45) Date of Patent: Apr. 7, 2020

(54) ORCHESTRATED HYDRATION OF A KNOWLEDGE GRAPH

(71) Applicant: Accenture Global Solutions Limited, Dublin (IE)

(72) Inventors: Teresa Sheausan Tung, San Jose, CA (US); Colin Anil Puri, San Jose, CA (US); Zhijie Wang, Fremont, CA (US); Matthew Bernard Kujawinski, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/198,237

(22) Filed: Nov. 21, 2018

(65) Prior Publication Data

US 2020/0012738 A1    Jan. 9, 2020

Related U.S. Application Data

(60) Provisional application No. 62/694,812, filed on Jul. 6, 2018.

(51) Int. Cl.
| | |
|---|---|
| *G06F 16/2458* | (2019.01) |
| *G06F 16/901* | (2019.01) |
| *G06F 16/21* | (2019.01) |
| *G06F 16/23* | (2019.01) |

(52) U.S. Cl.
CPC ........ *G06F 16/2465* (2019.01); *G06F 16/211* (2019.01); *G06F 16/2365* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2012/0246153 A1* | 9/2012 | Pehle | G06F 16/951 707/723 |
| 2014/0122422 A1* | 5/2014 | Tzadikevitch | G06F 16/1748 707/610 |
| 2018/0039696 A1* | 2/2018 | Zhai | G06F 16/367 |
| 2018/0159876 A1* | 6/2018 | Park | G06F 16/9024 |
| 2018/0218011 A1* | 8/2018 | Taycher | G06N 5/00 |

* cited by examiner

*Primary Examiner* — James Trujillo
*Assistant Examiner* — John J Morris
(74) *Attorney, Agent, or Firm* — Brinks Gilson & Lione

(57) ABSTRACT

A knowledge data management system (KDMS) implements data refinement orchestration, resolution, and refinement to provide a reusable and generic solution to ingest and link data via relationships and properties when constructing a knowledge graph. The KDMS thus operates to break down existing data storage silos by normalizing and integrating data with a uniform semantic schema, which results in more accurate and faster knowledge graph construction.

20 Claims, 7 Drawing Sheets

550

Supplier: {
   type: [Company]
   namespace: [Supply Chain]
   Purchase Orders: [Transactions.....]
   Supplier Agreement: legal documents
}

Customer: {
   type: [Company]
   namespace: [Sales]
   Sales Orders: [Transactions.....]
   Credit Rating: level
}

Organization: {
      type: [Node]
      Head Count: xx
      Location: xx
      Registration: xx
}

Company: {
      type: [Organization]
      Revenue: xx
      Profit: xx
      Location
}

ORCHESTRATED HYDRATION OF A KNOWLEDGE GRAPH

CROSS-REFERENCE TO RELATED APPLICATION(S)

This application claims benefit to U.S. Provisional Patent Application No. 62/694,812, filed on Jul. 6, 2018, the entirety of which is hereby incorporated by reference herein.

TECHNICAL FIELD

This disclosure relates to complex computer system architectures for extracting data from a data storage, normalizing the extracted data for consideration into a knowledge graph structure, and generating a knowledge graph structure based on the considered data. This disclosure further describes automated feedback processes for refining the data being considered for inclusion in the knowledge graph structure, where the knowledge graph structure provides improvements to other types of data structures in storing relevant information.

BACKGROUND

Certain approaches for searching enterprise data to answer an information query may include using string matching mechanisms to identify information stored in an unstructured data storage. However, such approaches are limited in their ability to provide accurate responses to the information query, and also require larger allocation of enterprise computing resources to extract, transform, and load information (ETL) from the unstructured data storage to enable searching of the information stored on the unstructured data storage.

DETAILED DESCRIPTION

Figure 1:
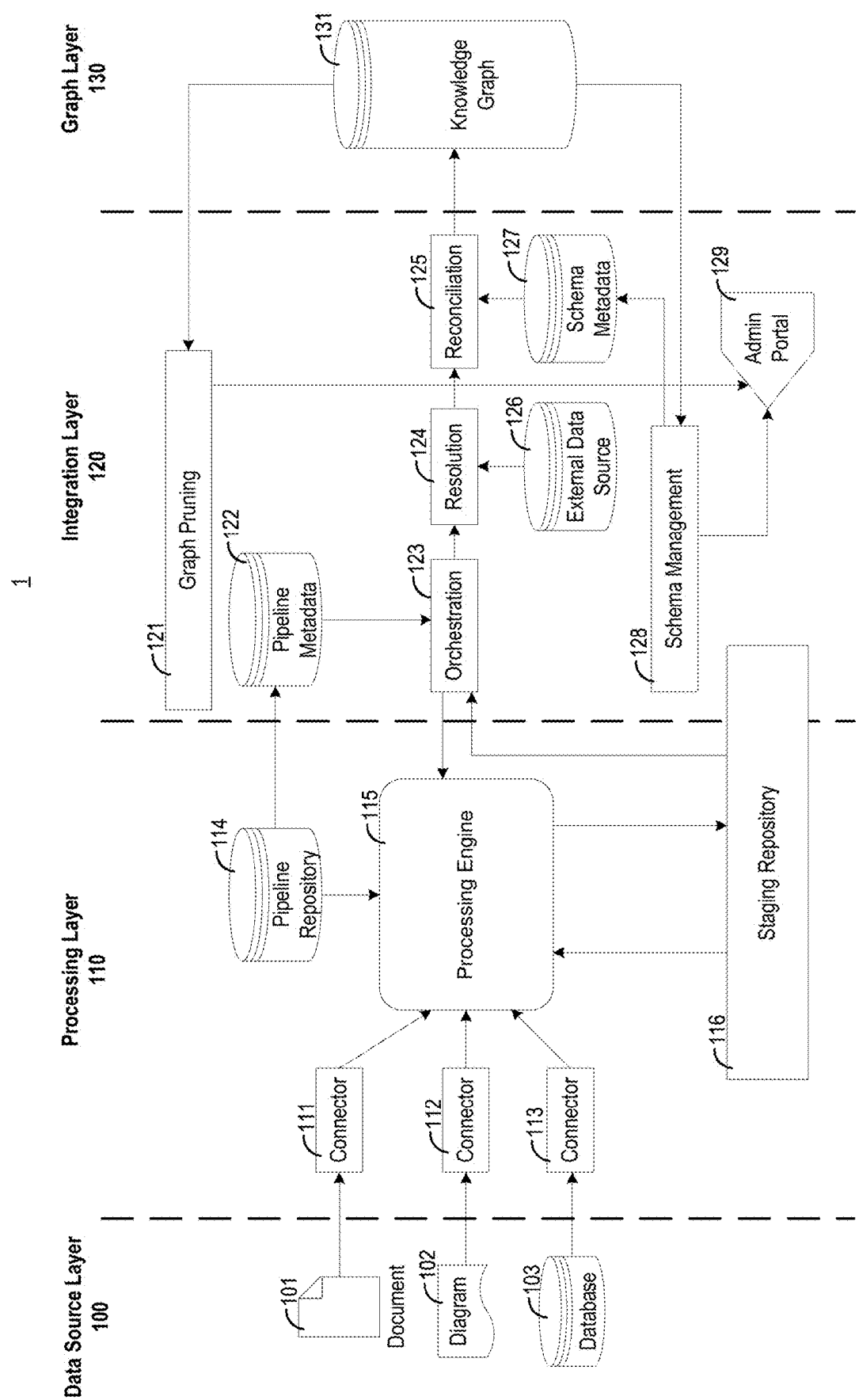
FIG. 1 shows an exemplary knowledge data management system.

In order to take advantage of the benefits offered by big data technologies, enterprise systems have access to large, and rapidly growing, volumes of information, both proprietary and public. Existing analytical applications and data warehousing systems have not been able to fully utilize this profound access to information. Often times information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

To address these technical problems, a knowledge graph is disclosed that offers an innovative data structure that presents relevant information in response to a data query, as well as relationship information between the relevant information. The knowledge graph includes a knowledge base of relevant information that is structured in a graph presentation that captures entities (i.e., nodes), relationships (i.e., edges), and attributes (i.e., node properties or edge properties) with semantic meaning. This graph data structure model offered by the knowledge graph provides the semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

Constructing a knowledge graph may include two steps. First, a graph schema definition is obtained for the knowledge graph and refinement is applied as the knowledge graph is being generated. This defines the types of vertices and edges that are generated into the knowledge graph. Second, the knowledge graph is hydrated with information by ingesting knowledge from multiple data sources and different knowledge extraction techniques (e.g., natural language processing (NLP), schema mapping, computer visions, or the like) to create the vertices and edges in the knowledge graph. Each data source may create its own data processing pipeline for extracting data to include into the knowledge graph being constructed.

However, different data processing pipelines and techniques produce different subsets of the knowledge graph, which may be in incompatible forms from each other. To add to this, the graph schema is constantly evolving due to changing enterprise requirements or query performance improvements. Thus, there is a need for orchestration and resolution of these processed intermediary results, before data/knowledge is inserted into a knowledge graph. Therefore, a system and technical solution that orchestrates and manages the different knowledge extraction techniques and data processing pipelines for knowledge graph construction is disclosed. As described in further detail, the technical solution includes the implementation of concept hierarchy and enabling flexibility for schema evolution during the knowledge graph construction process. Thus the data integration and semantic reasoning strategies serve to break down data storage silos by normalizing and integrating data with a uniform semantic schema.

FIG. 1 shows an exemplary architecture for a knowledge data management system (KDMS) 1. The KDMS 1 includes a data source layer 100, a processing layer 110, an integration layer 120, and a graph layer 130. Each layer may include the hardware, software, and/or circuitry for implementing the associated features.

The data source layer 100 includes data that may be searched in response to a received information query, such as a document 101, a diagram 102, and database 103. The data sources accessible by the data source layer 100 may be associated with an entity, a group of entities, or other sources of public and/or private data accessible through a communication network such as the Internet. For example, the data source layer may access data from a live newsfeed, online webpages, social media platforms, or online wiki pages that include collaborative collections of information pertaining to specific topics.

The processing layer 110 includes data connectors such as a first connector 111, a second connector 112, and a third connector 113, for normalizing the data extracted from the data source layer 100. The normalization process may include modifying a data format of the data extracted from the data source layer 100 into a data format compatible for the KDMS 1. The normalized data from the first connector 111, the second connector 112, and the third connector 113 is transmitted to a processing engine 115 that executes code for extracting data in response to the received information query.

The processing layer 110 also includes a pipeline repository 114 that stores data extraction rules, techniques, and protocols for extracting data from different data sources. The pipeline repository 114 stores a repository of instruction code and instruction protocols that can be used to extract entities and other information from a corpus of data. A knowledge graph storage 131 stores initial graph ontologies (i.e., graph schemas), where a graph ontology may be domain specific or otherwise customized for particular applications. A graph ontology is a high-level schema defining how various entities are related. For example, the graph ontology includes the information for defining all entity types, edge types, and their hierarchies for a specific knowledge graph. A graph ontology may be referred to as a graph schema within this disclosure.

Figure 2:
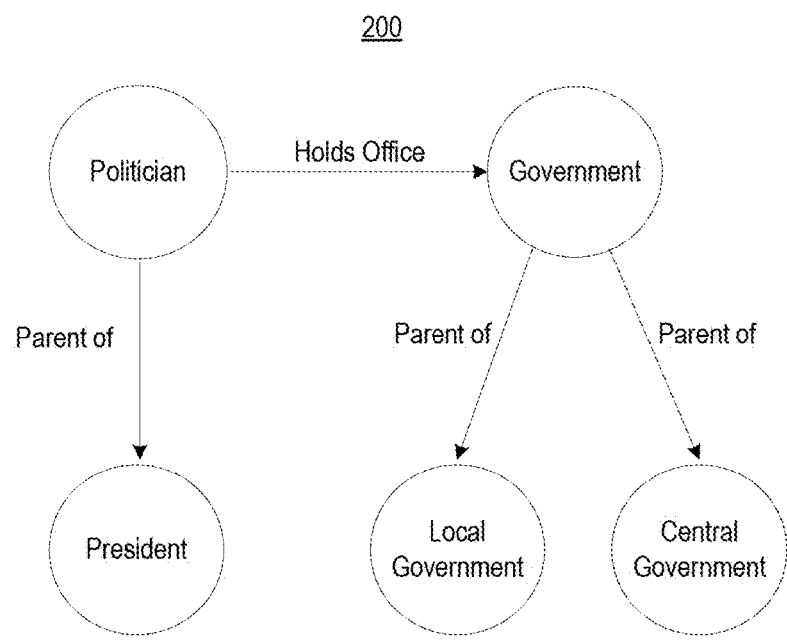
FIG. 2 shows an exemplary graph ontology.

An exemplary graph ontology 200 for a politician concept is shown in FIG. 2. In the graph ontology 200, there are five types of concepts shown, each represented by their respective node: a Politician type, a President type, a Government type, a Local Government type, and a Central Government type. The Politician type is a super type of the President type, and the Government type is a general concept that includes both the Local Government type and the Central Government type.

Referring back to the processing engine 115 shown in FIG. 1, the processing engine 115 is configured to extract data from different data sources in response to a received information query. For example, the processing engine 115 may apply F techniques on data to obtain an intent, sentiment, and/or nuances and context of spoken sentences of data to more accurately extract pertinent data. The processing engine 115 may further apply structured data denormalization and normalization techniques when parsing the data from the different data sources to better extract data. The processing engine 115 may further apply computer vision/object detection and recognition when parsing the data from the different data sources to better extract data. The techniques applied by the processing engine 115 to extract data from the different data sources may be considered to be the first step in the knowledge graph hydration process.

As part of a data refining process, the processing engine 115 initiates a feedback loop of data by feeding extracted data to a staging repository 116, where the staging repository then loops back intermediary results produced from other data processing pipelines back to the processing engine 115. The staging repository 116 may be a database such as a HDFS data storage system. The staging repository stores intermediary results from current data extraction processes being executed by the processing engine 115, as well as other intermediary results from other data processing pipelines that have been stored on the staging repository 116 as part of an orchestration process. Intermediary results may include a set of information extracted from a processing pipeline, where a processing pipeline (instructions) produces entities and relationships. The processing pipelines may be configured to be chained together to further refine the intermediary results to obtain a final output. The system described herein may not be tied to a specific data source or a specific type of data processing. Thus, the chaining of the processing pipelines is not static, but dynamic based on existing data and/or results of previous processes (i.e., the intermediary results). For an example of name entity extraction from a newspaper, in such context, politician entities that are extracted from the newspaper may be considered the intermediary result. Now some politician entities that are extracted may be further processed and classified as a specific politician, e.g., President. Then the President and the remaining set of Politicians from the intermediary results are considered to be the final results.

Each intermediary result may be data that comprises a portion of the knowledge graph being constructed. An intermediary result data stored on the staging repository may be further refined or ingested into the knowledge graph being constructed when the processing engine 115 determines further refinement is not needed.

The integration layer 120 implements the orchestration process via orchestration circuitry 123 for determining whether intermediary result data stored on the staging repository can be further refined. The further refinement of intermediary results may include the addition of a next level (i.e., deeper) sub-concept to the knowledge graph being constructed by an additional processing step. The KDMS 1 maintains a record of expected input and output types, in terms of concepts and relationships, for each data processing pipeline. These records may be stored as pipeline metadata 122. Records are created when new data processing pipelines are onboarded to the KDMS 1. A data processing pipeline may be defined by three components: 1) an input entity definition (type and attributes), 2) a logic entity definition (type and attributes), and 3) an output entity definition (type and attributes).

Figure 3:
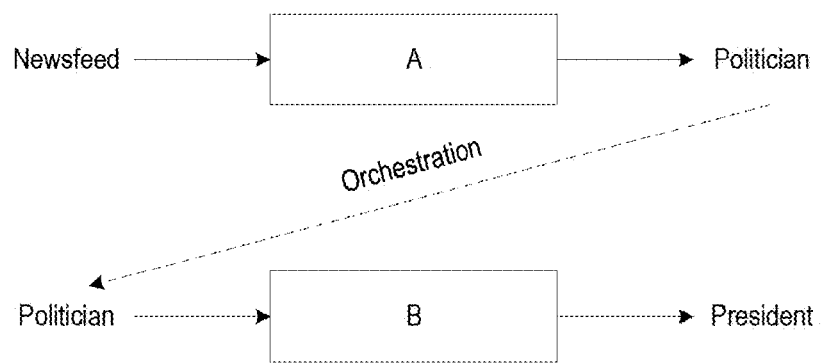
FIG. 3 shows two exemplary data processing pipelines.

A new data processing pipeline may be onboarded to the KDMS 1 by, for example, accessing a new data source. A new data processing pipeline may also be onboarded to the KDMS 1 by, for example, identifying new entity relationships. FIG. 3 shows two exemplary data processing pipelines 300, as well as a graphical representation of the orchestration process. A first data processing pipeline A receives a newsfeed as an input, and outputs a Politician entity type as an output (which may, or may not, be empty). A second data processing pipeline B includes the Politician entity type as an input, and the President entity type as an output. Both the first data processing pipeline A and the second data processing pipeline B may be running NLP to extract information from their respective data sources. Orchestration is performed by routing the resulting output (Politician entity type) from the first data processing pipeline A to be invoked by the second data processing pipeline B to process the resulting output.

Figure 4:
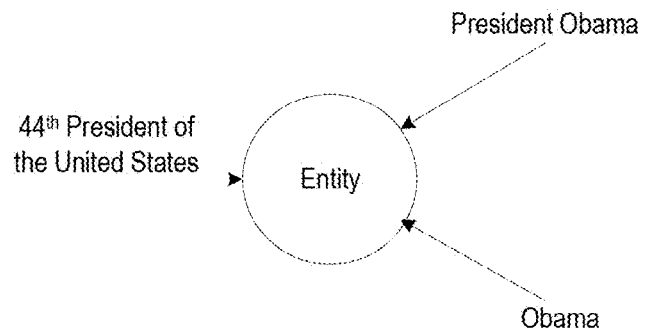
FIG. 4 shows an exemplary entity being considered for inclusion in a graph ontology.

The integration layer 120 further implements resolution processing of the intermediary results via resolution circuitry 124. Resolution processing observes the intermediary results and attempts to resolve different expressions of a same entity with information obtained from external data sources 126. For example, FIG. 4 illustrates an exemplary Entity 400 where three different expressions may be attempting to define the same Entity (44th President of the United States, President Obama, Obama). To resolve such situations where different expressions are found for a same real-world entity, the resolution circuitry 124 executes strategies with available contextual information to resolve the different expressions attributed to the same real-world entities. The strategies may follow one or more algorithms such as, for example, similarity algorithms, classification algorithms, detection algorithms, or recognition algorithms. The resolution processing improves the quality of the knowledge graph being constructed.

When the resolution processing fails to resolve the entities properly due to lack of available contextual information, the resolution circuitry 124 may perform analytical queries on the knowledge graph to generate a candidate pair of entities to be pruned or merged, and calculate a similarity using common connected entities of the candidate entity pair. These candidate pairs may be filtered by similarity scores, where if the score is above a confidence threshold the resolution circuitry 124 automatically merges the entities, and otherwise if the score is below the confidence threshold the resolution circuitry 124 may prompt a user (e.g., via a message displayed through an admin portal 129) to decide whether to merge the entities. It follows that the resolution circuitry 124 leverages both algorithms and external data sources (e.g., dictionary lookup to identify synonyms) to accomplish resolution tasks.

Figure 5:
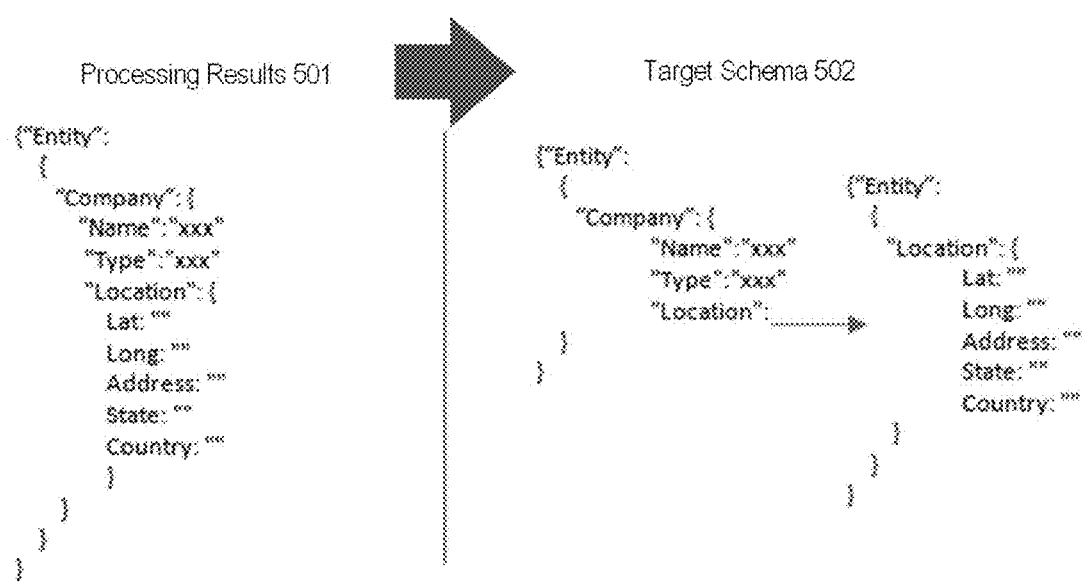
FIG. 5 shows an exemplary reconciliation of result data to a target schema and an exemplary namespace view.

The integration layer 120 further implements reconciliation processing of the intermediary results via reconciliation circuitry 125. Reconciliation processing includes schema reconciliation from a processing result to a target schema, where the target schema information is obtained from schema metadata 127. It may be difficult to define a storage schema for a knowledge graph. To address this technical problem, the reconciliation circuitry 125 provides a schema reconciliation mechanism to abstract processing components away from target storage schema. FIG. 5 illustrates an exemplary illustration of result data 500 for reconciling from a processing results 501 to a target schema 502. The result data 500 relates to Company Entities, where the location can be materialized as a property of the Company (left-side under Processing Results 501) to be externalized as a Location Entity (right-side under Target Schema 502). The data processing pipelines output entities in denormalized form (left-side), and the reconciliation circuitry 125 reconciliates the denormalized form and generates data insertion operations for graph knowledge hydration as shown under the target schema 502. Knowledge hydration for ingesting a new entity into the knowledge graph being constructed may be implemented when there is no existing knowledge entity remaining for a current result to be resolved to, as well as no further resolution for the result is determined to be required.

The KDMS 1 further includes schema management circuitry 128 to support graph versioning updates with namespace, and improve graph query performance by determining an effective level of data normalization. A namespace is a tag sub graph of the overall graph, and is a way for partitioning the knowledge graph. As noted, a namespace is a tagged sub graph. For each vertex V of the knowledge graph, there may be multiple tags for a namespace. Namespaces are used for partitioning the knowledge graph and logically organize the information. The advantage of utilizing a namespace is to properly organize the query scope when processing the data (traverse a sub-graph, not the entire knowledge graph) and manage concurrency locks (e.g., when an edit is done to a namespace, a related resource should be locked).

The schema management circuitry 128 takes in concept hierarchy information. The schema management circuitry 128 parses the concept hierarchy information to direct an acyclic graph of concepts, and examines information inheritance and overriding (e.g., algebraic data types from type theory). Combining the features of namespace, graph versioning, and type inheritance, makes it possible to implement schema branching and customization without breaking graph connectivity on the same knowledge graph.

Referring back to the same Company-Location result data example shown in FIG. 5, a company may be understood to be a for-profit organization. According to the result data 500, the schema management circuitry 128 parses the schema declaration and understands that Company inherits all the properties of Organization and is a sub type of Organization. This flexibility makes it possible to query across namespace. FIG. 5 also shows a namespace view 550, that also illustrates a concept hierarchy for the respective entities.

In an example related to a supply chain department and a sales department, for the supply chain department and the sales department to operate on the same knowledge graph, each department may extend the definition of Type Company, to type Supplier and type Customer per their respective needs. Company A may buy parts from Company B to produce a product P, then sell the product back to Company B. In this case, Company B is both a Customer and a Supplier. Supply chain department defines and manages Company B as a Supplier in Namespace <Supply Chain>, while sales department manages Company B as a Customer in Namespace <Sales>. A financial department may query all transactions, both purchasing order and sales order, related to Company B. The namespace capability is achieved as part of inheritance. At the information query time, namespace can be used as constraint to present data at detailed level (Company B as a Supplier). Schema versioning is important when concepts are branched out. The sales department may evolve the definition of Customer faster than supply chain department can do with Supplier. At the same time, the definition of Company is evolving. Each schema evolution updates the schema version for the concept, i.e. Supplier V4 inherits Company V2. The version number is internally managed by the integration component and can be overridden by administrative users (e.g., through control of the admin portal 129).

With each evolution of schema, the schema management circuitry 128 performs schema migration. For certain non-breaking schema changes, the schema management circuitry 128 is configured to be able to apply the changes automatically with, and in some embodiments without, a users' consent (adding or dropping types, attributes, or the like). The KDMS 1 is configured to allow end users to provide scripts to override the schema migration process, e.g., removing property Name from Person type and adding First Name property and Last Name property will require migrate existing Person entities' Name property to First Name and Last Name with user provided logic.

The schema management circuitry 128 collects metadata related to the knowledge graph during ingestion time to suggest a schema evolution for improving query performance and knowledge graph quality. The schema management circuitry 128 further performs analytical queries that compute the information entropy/discrepancy given the schema information and metadata collected during ingestion time, according to, for example, the conditional functional dependency formula:

$$(X \rightarrow_\alpha Y, Tp)$$

Where X and Y are concepts and $\rightarrow_\alpha$ is the relationship, all defined in schema. Tp represents the pattern tuple for $X \to_\alpha Y$. The relationship $\alpha$'s Strength is evaluated by the following two formulations (1) and (2):

$$\text{Strength}(X, Y, \alpha) = \frac{C(\alpha \mid X, Y)}{C(X) \times C(Y)} \quad (1)$$

$$\text{Strength}(X, Y, \alpha, \alpha') = \frac{C(a, \alpha' \mid X, Y)}{C(\alpha \mid X, Y)} \text{ for } \alpha' \in \alpha \quad (2)$$

Formulation (1) is used to calculating the usefulness of relationship $\alpha$. C(X) and C(Y) are the counts of vertices with type X and Y; C($\alpha$|X,Y) is the count of relationship $\alpha$ for type X and Y. This metadata is collected during ingestion. If the Strength(X, Y, $\alpha$) is below certain threshold, then the system recommends the end users to remove relationship $\alpha$.

Formulation (2) is used to calculating the quality of relationship $\alpha$ by hypothesizing a relationship $\alpha'$ from Tp, where $\alpha' \in \alpha$. If Strength(X, Y, $\alpha$, $\alpha'$) is greater than a certain threshold (there is information gain), then the system suggests evolving relationship $\alpha$ to $\alpha'$ and migrate all relationship ($\alpha$, ¬$\alpha'$) as relationship $\beta$.

The KDMS 1 further includes the graph layer 130 comprised of the knowledge graph storage 131. The knowledge graph storage 131 stores entities (nodes), relationships (edges), and attributes (node/edge properties). The knowledge graph storage 131 further supports hierarchical entities and relationships, e.g., President is a sub-concept of Politician. The knowledge graph storage 131 may further store the constructed knowledge graph. A knowledge graph stored in the knowledge graph storage 131 may further be sent to the integration layer for subsequent graph pruning 121. The graph pruning 121 includes the deletion of certain edges and/or nodes identified for removal from the knowledge graph according to predetermined criteria.

Figure 6:
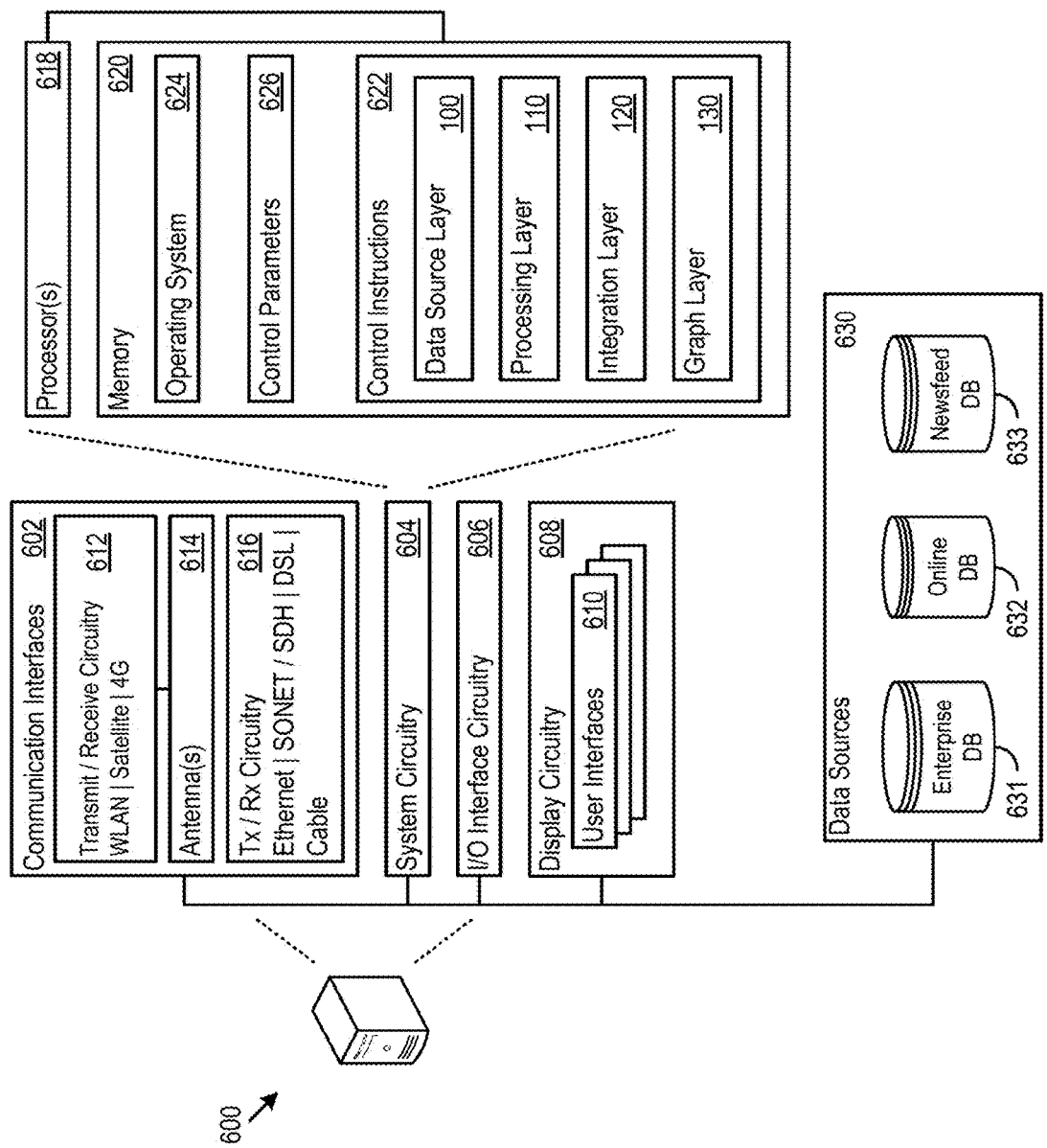
FIG. 6 shows an exemplary computer architecture for a computer device.

FIG. 6 illustrates an exemplary computer architecture of a computer device 600 on which the features of the KDMS 1 may be executed. The computer device 600 includes communication interfaces 602, system circuitry 604, input/output (I/O) interface circuitry 606, and display circuitry 608. The graphical user interfaces (GUIs) 610 displayed by the display circuitry 608 may be representative of GUIs generated through the admin portal 129. The GUIs may be displayed locally using the display circuitry 608, or for remote visualization, e.g., as HTML, JavaScript, audio, and video output for a web browser running on a local or remote machine. Among other interface features, the GUIs 610 may further render displays of the constructed knowledge graphs.

The GUIs 610 and the I/O interface circuitry 606 may include touch sensitive displays, voice or facial recognition inputs, buttons, switches, speakers and other user interface elements. Additional examples of the I/O interface circuitry 606 includes microphones, video and still image cameras, headset and microphone input/output jacks, Universal Serial Bus (USB) connectors, memory card slots, and other types of inputs. The I/O interface circuitry 606 may further include magnetic or optical media interfaces (e.g., a CDROM or DVD drive), serial and parallel bus interfaces, and keyboard and mouse interfaces.

The communication interfaces 602 may include wireless transmitters and receivers ("transceivers") 612 and any antennas 614 used by the transmit and receive circuitry of the transceivers 612. The transceivers 612 and antennas 614 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 602 may also include serial interfaces, such as universal serial bus (USB), serial ATA, IEEE 1394, lighting port, I²C, slimBus, or other serial interfaces. The communication interfaces 602 may also include wireline transceivers 616 to support wired communication protocols. The wireline transceivers 616 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 604 may include any combination of hardware, software, firmware, or other circuitry. The system circuitry 604 may be implemented, for example, with one or more systems on a chip (SoC), application specific integrated circuits (ASIC), microprocessors, discrete analog and digital circuits, and other circuitry. The system circuitry 604 may implement any desired functionality of the KDMS 1. As just one example, the system circuitry 604 may include one or more instruction processor 618 and memory 620.

The memory 620 stores, for example, control instructions 622 for executing the features of the KDMS 1, as well as an operating system 624. In one implementation, the processor 618 executes the control instructions 622 and the operating system 624 to carry out any desired functionality for the KDMS1, including those attributed to the data source layer 100, the processing layer 110, the integration layer 120, or the graph layer 130. The control parameters 626 provide and specify configuration and operating options for the control instructions 622, operating system 624, and other functionality of the computer device 600.

The computer device 600 may further include various data sources 630, including an enterprise database 631, an online database 632, and a newsfeed database 633. Each of the databases that are included in the data sources 630 may be accessed by the KDMS 1 to obtain knowledge data for consideration to integrate into the knowledge graph being constructed.

Figure 7:
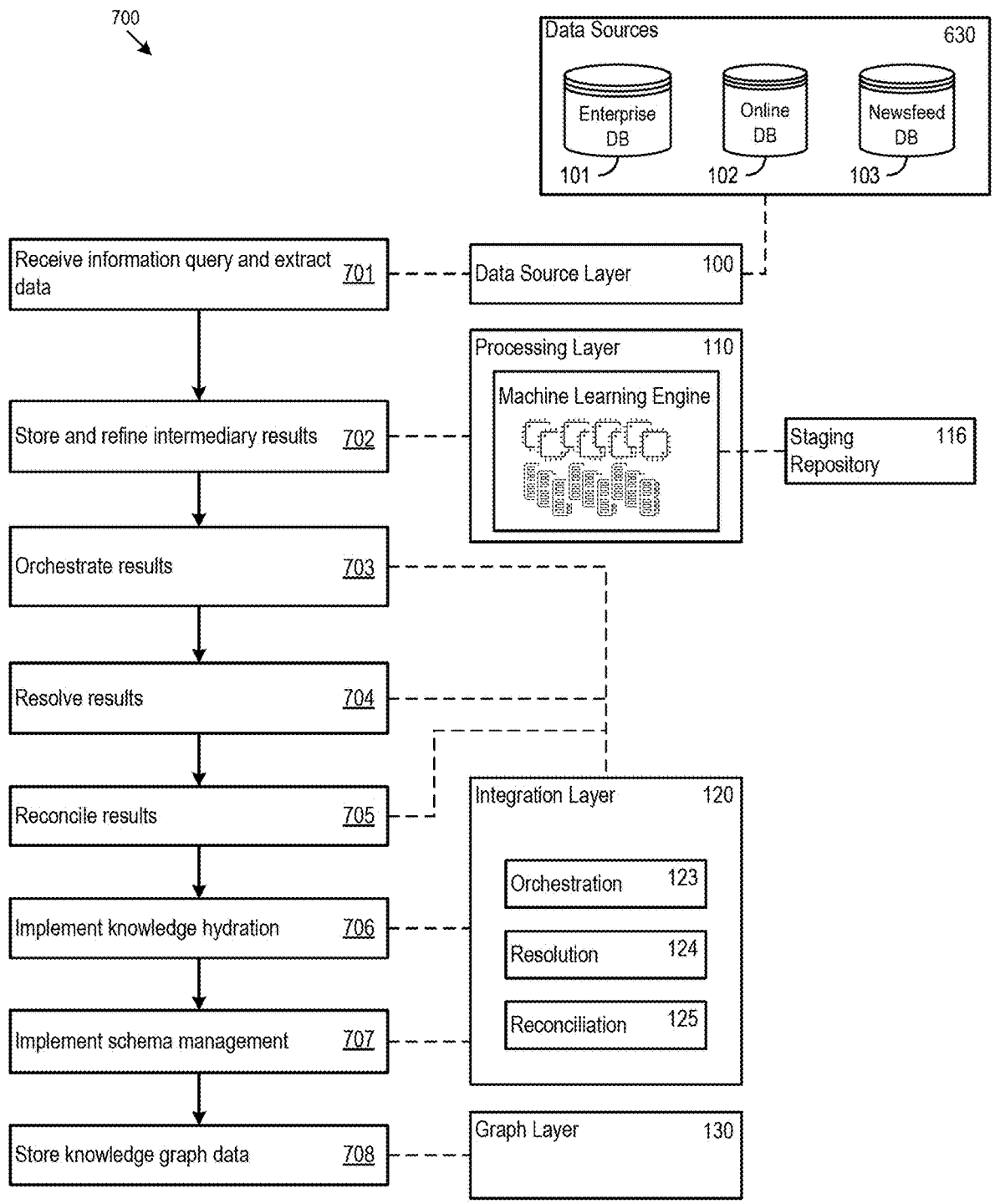
FIG. 7 shows another exemplary flow diagram of logic describing a process implemented by a knowledge data management system.

FIG. 7 illustrates a flow diagram 700 of logic describing a process implemented by the KDMS 1 to construct a knowledge graph. The knowledge graph construction process may be in response to an information query received by the KDMS 1, where the knowledge graph is constructed as a response to the information query.

At 701, the KDMS 1 receives the information query and begins to extract data from one or more data sources. For example, the data source layer 100 accesses available data sources 630, and extracts data from the data sources 630 that are determined to be relevant to answering the information query. The data source layer 100 implements data extraction techniques, as described herein. Each data source that is accessed by the data source layer 100 may establish its own respective data processing pipeline.

At 702, the KDMS 1 stores intermediary results from the data extraction into the staging repository 116. For example, the processing layer 110 controls storage of the intermediary results into the staging repository 116. The processing layer 110 further controls refinement of the intermediary results, as described herein. To achieve efficient and effective refinement, the processing layer 110 may include a machine learning engine for applying machine learning techniques to the refinement process. The machine learning engine may be included in the processing engine 115.

At 703, the integration layer 120 orchestrates the intermediary results. For example, the orchestration circuitry 123 examines the intermediary results stored on the staging repository 116 and determines whether the intermediary results can be further refined to a sub concept by an additional processing step, as described herein.

At 704, the integration layer 120 resolves the intermediary results. For example, the resolution circuitry 124 resolves instances of different expressions being applied to a same real-life entity, as described herein.

At 705, the integration layer 120 reconciles the intermediary results. For example, the reconciliation circuitry 125 reconciles the intermediary results to existing knowledge, as described herein.

At 706, the integration layer 120 implements knowledge hydration to the knowledge graph being constructed, as described herein. For example, the integration layer 120 implements the knowledge hydration to ingest new entities into the knowledge graph being constructed when it is determined that no further refinement is applicable.

At 707, the integration layer 120 implements schema management. For example, the integration layer 120 implements schema management to support graph versioning with namespace features, and to improve graph query performance by determining an effective level of data normalization, as described herein.

At 708, the graph layer 130 stores graph data into the knowledge graph storage 131, as described herein. The graph data may include Standard Linked Property Graph type of data for storage. At the storage level, the information being stored may not be differentiated. Edge data may include id, label, properties, namespace, or other data types. Vertex data may include id, label, properties, namespace, or other data types.

The knowledge graph storage 131 may further store previously constructed knowledge graphs for future reference.

Various implementations have been specifically described. However, other implementations that include a fewer, or greater, number of features for each of the apparatuses, methods, or other embodiments described herein are also possible.

What is claimed is:

1. A system comprising:
   knowledge extraction circuitry configured to:
      receive a search query;
      parse a database comprising historical data; and
      extract, from the database, a data set of intermediary results corresponding to the search query;
   processing circuitry configured to:
      receive the data set of intermediary results;
      provide the intermediary results to a staging repository;
      receive, from a supplemental pipeline data source, a supplemental data set of additional intermediary results;
      provide the supplemental data set of additional intermediary results to the staging repository;
      iteratively refine, using the staging repository, the data set of intermediary results with the additional intermediary results for inclusion in a knowledge graph into subsequent levels of one or more additional sub-concepts until a condition for ceasing further refinement is satisfied;
      generate, based on the iterative refinement, a refined data set comprising refined intermediary results; and
      store the refined data set in the staging repository;
   integration circuitry configured to:
      orchestrate, from the refined data set, a knowledge data set to synchronize with a knowledge graph schema;
      resolve, within the knowledge data set, instances of different expressions of a same entity;
      reconcile the knowledge data set to existing knowledge profiles; and
      perform schema management; and
   knowledge graph circuitry configured to:
      generate the knowledge graph to be a visual representation of the knowledge data set, wherein the knowledge graph includes nodes and connecting edges that represent entity and relationship information, respectively, included in the knowledge data set.

2. The system of claim 1, wherein the processing circuitry is further configured to:
   normalize data comprising the data set into a common data format.

3. The system of claim 1, wherein the integration circuitry is configured to execute an algorithm with contextual information to resolve the instances of different expressions of the same entity.

4. The system of claim 3, wherein the algorithm includes at least one of a similarity algorithm, a classification algorithm, a detection algorithm, or a recognition algorithm.

5. The system of claim 1, wherein the integration circuitry is configured to reconcile the knowledge data to revise the knowledge data set to a target schema.

6. The system of claim 1, wherein the schema management includes at least one of graph versioning, namespacing, concept hierarchy, schema migration, or graph pruning.

7. The system of claim 1, wherein the knowledge extraction circuitry is configured to extract the data set from a plurality of data source pipelines.

8. The system of claim 7, wherein the plurality of data source pipelines includes at least two or more of online data, an updating newsfeed, or an enterprise database.

9. The system of claim 1, wherein the knowledge extraction circuitry is configured to extract the data set according to an applied natural language processing (NLP), a structured data denormalization and normalization, or a computer vision/object detection and recognition technique.

10. The system of claim 1, wherein the integration circuitry is configured to orchestrate the knowledge data set from the refined data set by further refining the refined data set into an additional sub concept.

11. The system of claim 1, wherein the knowledge graph schema is stored in a graph repository including graph entity types, graph edge types, and corresponding graph hierarchies.

12. A method comprising:
   receiving, by a knowledge extraction circuitry, a search query;
   parsing, by the knowledge extraction circuitry, a database comprising historical data;
   extracting, by the knowledge extraction circuitry, a data set of intermediary results corresponding to the search query from the database;
   receiving, by a processing circuitry, the data set of intermediary results;
   providing, by the processing circuitry, the intermediary results to a staging repository;
   receiving, by the processing circuitry, a supplemental data set of additional intermediary results from a supplemental pipeline data source;
   providing, by the processing circuitry, the supplemental data set of additional intermediary results to the staging repository;
   iteratively refining, by the processing circuitry, the data set of intermediary results with the additional intermediary results for inclusion in a knowledge graph using the staging repository, wherein the data set of intermediary results is iteratively refined into subsequent levels of one or more additional sub-concepts until a condition for ceasing further refinement is satisfied;

generating, by the processing circuitry, a refined data set comprising refined intermediary results based on the iterative refinement; and storing, by the processing circuitry, the refined data set in the staging repository;

orchestrating, by an integration circuitry, a knowledge data set from the refined data set, wherein the knowledge data set synchronizes with a knowledge graph schema;

resolving, by the integration circuitry, instances within the knowledge data set of different expressions of a same entity;

reconciling, by the integration circuitry, the knowledge data set to existing knowledge profiles;

performing, by the integration circuitry, schema management; and generating, by a knowledge graph circuitry, a knowledge graph to be a visual representation of the knowledge data set, wherein the knowledge graph includes nodes and connecting edges that represent entity and relationship information, respectively, included in the knowledge data set.

13. The method of claim 12, further comprising:
normalizing, by the processing circuitry, data comprising the data set into a common data format.

14. The method of claim 12, wherein resolving instances within the knowledge data set of different expressions of a same entity comprises executing an algorithm with contextual information to resolve the instances of different expressions of the same entity; and
wherein the algorithm includes at least one of a similarity algorithm, a classification algorithm, a detection algorithm, or a recognition algorithm.

15. The method of claim 12, wherein reconciling the knowledge data set comprises revising the knowledge data set to a target schema to reconcile the knowledge data set.

16. The method of claim 12, wherein the schema management includes at least one of graph versioning, namespacing, concept hierarchy, schema migration, or graph pruning.

17. The method of claim 12, wherein the data set is extracted from a plurality of data source pipelines including at least two or more of online data, an updating newsfeed, or an enterprise database.

18. A system comprising:
a machine-readable medium, other than a transitory signal; and
instructions stored on the machine-readable medium that, when executed by processing circuitry, cause a computing device to:
receive a search query;
parse a database comprising historical data;
extract, from the database, a data set of intermediary results corresponding to the search query;
receive the data set of intermediary results;
provide the intermediary results to a staging repository;
receive, from a supplemental pipeline data source, a supplemental data set of additional intermediary results;
provide the supplemental data set of additional intermediary results to the staging repository;
iteratively refine, using the staging repository, the data set of intermediary results with the additional intermediary results for inclusion in a knowledge graph into subsequent levels of one or more additional sub-concepts until a condition for ceasing further refinement is satisfied;
generate, based on the iterative refinement, a refined data set comprising refined intermediary results; and
store the refined data set in the staging repository;
orchestrate, from the refined data set, a knowledge data set to synchronize with a knowledge graph schema;
resolve, within the knowledge data set, instances of different expressions of a same entity;
reconcile the knowledge data set to existing knowledge profiles;
perform schema management; and
generate the knowledge graph to be a visual representation of the knowledge data set, wherein the knowledge graph includes nodes and connecting edges that represent entity and relationship information, respectively, included in the knowledge data set.

19. The system of claim 18, wherein the instructions, when executed by the processing circuitry, further cause the computing device to:
normalize data comprising the data set into a common data format.

20. The system of claim 18, wherein the schema management includes at least one of graph versioning, namespacing, concept hierarchy, schema migration, or graph pruning.

* * * * *